Patented June 26, 1945

2,379,097

UNITED STATES PATENT OFFICE 2,379,097

γ-TRICHLOROBUTYRONITRILE AND METHOD FOR ITS PREPARATION

Warren Niederhauser and Herman A. Bruson, Philadelphia, Pa., assignors to The Resinous Products & Chemical Company, Philadelphia, Pa., a corporation of Delaware No Drawing. Application July 8, 1944, Serial No. 544,136

9 Claims. (Cl. 260—464)

This invention relates to γ-trihalobutyronitriles, having the formula

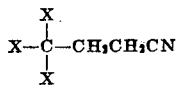

and to a method for their preparation.

According to this invention, acrylonitrile is reacted with a haloform in the presence of a strongly alkaline condensing agent as catalyst to yield γ-trihalobutyronitrile.

As a haloform, there may be used chloroform or bromoform.

Suitable alkaline catalysts for the reaction are the alkali metal hydroxides, such as lithium, sodium, or potassium hydroxides, quaternary ammonium hydroxides, such as trimethyl benzyl ammonium hydroxide, dimethyl dibenzyl ammonium hydroxide, or triethyl benzyl ammonium hydroxide, or other strong base. The amount of strongly alkaline condensing agent which may be used may vary from about 2% to about 20% of the combined weights of the reactants.

The reaction may be performed with or without the use of an inert organic solvent. Typical of the solvents which may be used are tert.-butyl alcohol, acetonitrile, benzene, ether, dioxane, and the like.

The reaction is advantageously carried out at about 0° C. to about 35° C. Somewhat higher temperatures are feasible, however, particularly to complete the reaction. On the other hand, it might be noted that in some cases temperatures above 50° C. are associated with decreased yields of the desired products. The temperature may be controlled if necessary by external cooling.

After the reaction has been carried out, the strongly alkaline condensing agent is removed by washing, neutralizing, or other suitable step and the desired products may then be readily separated and purified, if desired, as by distillation.

The following examples illustrate this invention:

Example 1

Forty grams of a 40% aqueous solution of trimethyl benzyl ammonium hydroxide at 2° C. was mixed with 447 g. of chloroform at 2° C. and to the cooled mixture there was added dropwise with stirring 202 g. of acrylonitrile. The mixture was stirred eight hours at 0°–5° C., at the end of which time an additional 10 g. of 40% aqueous trimethyl benzyl ammonium hydroxide was added, and the mixture was stirred 16 hours longer at 0°–5° C. The reaction mixture was washed twice with water and then distilled. A mixture of 474 g. of chloroform and acrylonitrile, boiling between 60° and 80° C., was recovered. The residual oil was distilled in vacuo to yield 75 g. of γ-trichlorobutyronitrile boiling at 91°–103° C. at 16 mm., which solidified in the receiver. Upon redistillation, the product boiled at 90°–95° C./12 mm. or 214°–216° C./760 mm.

Upon recrystallization from petroleum ether, it formed colorless needles melting at 41° C. It possesses a mint-like odor and is very soluble in methanol, acetone, benzene and carbon tetrachloride but is insoluble in cold water.

Example 2

Ten grams of finely powdered potassium hydroxide was added to 62 g. of chloroform at 2° C. The mixture was stirred and maintained at 0°–5° C. while 27 g. of acrylonitrile was added dropwise. The mixture was stirred at 0° C. for four hours and then acidified with dilute hydrochloric acid and filtered. The filtrate was washed twice with water and distilled to give 10.5 g. of γ-trichlorobutyronitrile, B. P. 95°–105° C./17 mm., which solidified in the receiver as a colorless, crystalline mass.

Example 3

Ten grams of 40% aqueous trimethyl benzyl ammonium hydroxide was added to 126 g. of bromoform at 10° C. Acrylonitrile (27 g.) was added dropwise while the mixture was stirred and the temperature maintained between 5–10° C. The mixture was stirred three hours at 5–10° C. and three hours at 25° C.; it was then washed with water and distilled under reduced pressure to give 74 g. of bromoform and 7 g. of product, B. P. 126°–128° C./6 mm., which solidified in the receiver and was recrystallized from petroleum ether to give white needles, M. P. 98° C., having the formula $Br_3CCH_2CH_2Cn$. The compound is soluble in alcohol, ether, acetone, benzene, and ethylene dichloride, and slightly soluble in petroleum ether.

It is to be understood that in accordance with this invention the proportions and reaction conditions can be varied widely. Thus, one may use an excess of acrylonitrile or of haloform and the quantity of catalyst can be varied considerably without departing from the spirit of the invention.

It is rather surprising that, whereas the lower haloalkyl nitriles, chlorobutyronitrile and bromobutyronitrile, are lachrymatory, the trihalobutyronitriles of this invention have pleasant odors, illustrating the distinctive properties of the products of this invention. Upon hydrolysis, the trihalobutyronitriles yield succinic acid. They may also be used as intermediates for the preparation of carboxylic derivatives. Furthermore, the compounds of this invention have insecticidal properties and yield derivatives which also have such properties.

We claim:

1. A method for preparing γ-trihalobutyronitriles, which comprises reacting a haloform, $X_3CH$, wherein X is a halogen selected from a member of the group consisting of chlorine and bromine, with acrylonitrile in the presence of an alkaline condensing agent.

2. A method for preparing γ-trichlorobutyronitrile, $Cl_3C-CH_2CH_2CN$, which comprises reacting chloroform with acrylonitrile in the presence of an alkaline condensing agent.

3. A method for preparing γ-trichlorobutyronitrile, $Cl_3C-CH_2CH_2CN$, which comprises reacting chloroform with acrylonitrile in the presence of a quaternary ammonium hydroxide.

4. A method for preparing γ-trichlorobutyronitrile, $Cl_3C-CH_2CH_2CN$, which comprises reacting chloroform with acrylonitrile in the presence of an alkali metal hydroxide.

5. A method for preparing γ-trichlorobutyronitrile, $Cl_3C-CH_2CH_2CN$, which comprises reacting chloroform with acrylonitrile in the presence of potassium hydroxide as a catalyst.

6. A method for preparing γ-trichlorobutyronitrile, $Cl_3C-CH_2CH_2CN$, which comprises reacting chloroform with acrylonitrile in the presence of trimethyl benzyl ammonium hydroxide.

7. A γ-trihalobutyronitrile having the formula $X_3C-CH_2CH_2CN$ wherein X is a halogen selected from a member of the group consisting of chlorine and bromine.

8. γ-Trichlorobutyronitrile having the formula $Cl_3C-CH_2CH_2CN$.

9. γ-Tribromobutyronitrile having the formula $Br_3C-CH_2CH_2CN$.

WARREN NIEDERHAUSER.
HERMAN A. BRUSON.